US010685506B2

(12) United States Patent
Tong et al.

(10) Patent No.: US 10,685,506 B2
(45) Date of Patent: Jun. 16, 2020

(54) APPARATUS AND METHOD THAT DETECT WHEEL ALIGNMENT CONDITION

(71) Applicant: GM GLOBAL TECHNOLOGY OPERATIONS LLC, Detroit, MI (US)

(72) Inventors: Wei Tong, Troy, MI (US); Hojjat Izadi, Toronto (CA); Fahim Javid, Pickering (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 107 days.

(21) Appl. No.: 15/960,781

(22) Filed: Apr. 24, 2018

(65) Prior Publication Data

US 2019/0325670 A1    Oct. 24, 2019

(51) Int. Cl.
*G07C 5/08* (2006.01)
*G07C 5/00* (2006.01)

(52) U.S. Cl.
CPC ......... *G07C 5/0808* (2013.01); *G07C 5/008* (2013.01); *G07C 5/0825* (2013.01)

(58) Field of Classification Search
CPC combination set(s) only.
See application file for complete search history.

(56) References Cited

U.S. PATENT DOCUMENTS

2002/0029101 A1\* 3/2002 Larson ................... G07C 5/008
  701/32.6
2017/0190355 A1\* 7/2017 Ghoneim ............. B62D 5/0481

\* cited by examiner

*Primary Examiner* — Abby Y Lin
*Assistant Examiner* — Renee LaRose (57) ABSTRACT

An apparatus and method that detect a wheel alignment condition are provided. The method includes receiving a dataset comprising one or more from among a steering wheel angle parameter, a speed parameter, a lateral acceleration parameter, a self-aligning torque parameter and a power steering torque parameter, normalizing the received dataset, analyzing the normalized dataset according to a model for determining a wheel alignment condition, and outputting a value indicating whether the wheel alignment is within a predetermined value based on the model.

18 Claims, 5 Drawing Sheets

APPARATUS AND METHOD THAT DETECT WHEEL ALIGNMENT CONDITION

INTRODUCTION

Apparatuses and methods consistent with exemplary embodiments relate to detecting a wheel alignment condition. More particularly, apparatuses and methods consistent with exemplary embodiments relate to detecting a wheel alignment condition of a vehicle.

SUMMARY

One or more exemplary embodiments provide a method and an apparatus that detect a wheel alignment condition based on vehicle sensor information. More particularly, one or more exemplary embodiments provide a method and an apparatus that detect wheel alignment condition by applying a model to vehicle sensor information.

According to an aspect of an exemplary embodiment, a method for detecting a wheel alignment condition is provided. The method includes receiving a dataset comprising one or more from among a steering wheel angle parameter, a speed parameter, a lateral acceleration parameter, a torsion bar torque parameter, a self-aligning torque parameter and a power steering torque parameter, normalizing the received dataset, analyzing the normalized dataset according to a model for determining a wheel alignment condition, and outputting a value indicating whether the wheel alignment is within a predetermined value based on the model.

The analyzing the normalized data according to the model includes inputting the normalized dataset into a classification model generated based on a set of normalized training data including a steering wheel angle parameter, a speed parameter, a torsion bar torque parameter, a lateral acceleration parameter, a self-aligning torque parameter and a power steering torque parameter, and receiving an output from the classification model indicating whether the wheel alignment is within a predetermined range.

The classification model may be generated by generating a training dataset including a first normalized dataset corresponding to proper wheel alignment and a second normalized dataset corresponding to improper wheel alignment, the first and second normalized data sets including parameters corresponding to a steering wheel angle parameter, a speed parameter, a torsion bar torque parameter, a lateral acceleration parameter, a self-aligning torque parameter and a power steering torque parameter, shuffling the training dataset, dividing the shuffled dataset into a classification training set and a classification validation set, training a classification model based on the classification training set, validating the trained classification model based on the classification validation set for tuning the trained classification parameters, and outputting the validated and trained classification model as the classification model.

The normalizing the received dataset may include normalizing the received dataset according to one from among scaling, standardization, and unit length normalization.

The predetermined value may correspond to a correctly calibrated wheel alignment.

The model for determining wheel alignment condition may capable of determining at least one from among a negative camber condition of wheels, a positive camber condition of wheels, a cross-camber condition of wheels, a toe-in condition of wheels, a toe-out condition of wheels, a cross-toe condition of wheels, a total-toe condition of wheels and a cross-caster condition of wheels.

The steering wheel angle parameter may be measured by a transducer, the speed parameter may be measured by a wheel speed tachometer, the lateral acceleration parameter may be measured by an inertial measurement unit, the self-aligning torque parameter may be calculated from a torsion bar torque parameter and the power steering torque parameter, and the power steering torque parameter may be calculated from electronic power steering current measurements.

The outputting the value indicating whether the wheel alignment is within the predetermined value based on the model may include displaying the value on vehicle display, a mobile device, or on a backend computer.

The analyzing the normalized dataset according to a model for determining wheel alignment condition may include transmitting the normalized dataset to a server configured to analyze the normalized dataset and receiving the value indicating whether the wheel alignment condition is within the predetermined value from the server.

According to an aspect of an exemplary embodiment, an apparatus that detects a wheel alignment condition is provided. The apparatus includes at least one memory comprising computer executable instructions and at least one processor configured to read and execute the computer executable instructions. The computer executable instructions cause the at least one processor to: receive a dataset comprising one or more from among a steering wheel angle parameter, a speed parameter, a lateral acceleration parameter, a self-aligning torque parameter and a power steering torque parameter, normalize the received dataset, analyze the normalized dataset according to a model for determining a wheel alignment condition; and output a value indicating whether the wheel alignment condition is within a predetermined value based on the model.

The computer executable instructions may cause the at least one processor to analyze the normalized data according to the model by inputting the normalized dataset into a classification model generated based on a set of normalized training data including a steering wheel angle parameter, a speed parameter, a lateral acceleration parameter, a self-aligning torque parameter and a power steering torque parameter, and receiving an output from the classification model indicating whether the wheel alignment is within a predetermined range.

The classification model may be generated by generating a training dataset including a first normalized dataset corresponding to proper wheel alignment and a second normalized dataset corresponding to improper wheel alignment, the first and second normalized data sets including parameters corresponding to a steering wheel angle parameter, a speed parameter, a lateral acceleration parameter, a self-aligning torque parameter and a power steering torque parameter, shuffling the training dataset, dividing the shuffled dataset into a classification training set and a classification validation set, training a classification model based on the classification training set, validating the trained classification model based on the classification validation set for tuning the trained classification, and outputting the validated and trained classification model as the classification model.

The computer executable instructions may cause the at least one processor to normalize the received dataset according to one from among a scaling method, a standardization method, and a unit length normalization method.

The predetermined value may correspond to a correctly calibrated wheel alignment.

The model for determining the wheel alignment condition may be configured to determine at least one from among a negative camber condition of wheels, a positive camber condition of wheels, a cross-camber condition of wheels, a toe-in condition of wheels, a toe-out condition of wheels, a cross-toe condition of wheels, a total toe condition of wheels and a cross-caster condition of wheels.

The computer executable instructions may cause the at least one processor to determine the steering wheel angle parameter from a transducer, determine the speed parameter from a wheel speed tachometer, determine the lateral acceleration parameter from an inertial measurement unit, calculate the self-aligning torque parameter from a torsion bar torque parameter and the power steering torque parameter, and calculate the power steering torque parameter from electronic power steering current measurements.

The computer executable instructions may cause the at least one processor to output the value indicating whether the wheel alignment is within the predetermined value based on the model by displaying the value on vehicle display, a mobile device, or on a backend computer.

The computer executable instructions cause the at least one processor to analyze the normalized dataset according to a model for determining wheel alignment condition by transmitting the normalized dataset to a server configured to analyze the normalized dataset and receiving the value indicating whether the wheel alignment condition is within the predetermined value from the server.

The at least one processor may include a vehicle electronic controller unit configured to retrieve the one or more from among a steering wheel angle parameter, a speed parameter, a lateral acceleration parameter, a self-aligning torque parameter and a power steering torque parameter from a CAN bus.

Other objects, advantages and novel features of the exemplary embodiments will become more apparent from the following detailed description of exemplary embodiments and the accompanying drawings.

BRIEF DESCRIPTION OF THE DRAWINGS

The disclosed examples will hereinafter be described in conjunction with the following drawing figures, wherein like numerals denote like elements, and wherein.

DETAILED DESCRIPTION

An apparatus and method that detect a wheel alignment condition will now be described in detail with reference to FIGS. 1-5 of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "attached to," "formed on," or "disposed on" a second element, the first element may be connected directly to, formed directly on or disposed directly on the second element or there may be intervening elements between the first element and the second element, unless it is stated that a first element is "directly" connected to, attached to, formed on, or disposed on the second element. In addition, if a first element is configured to "send" or "receive" information from a second element, the first element may send or receive the information directly to or from the second element, send or receive the information via a bus, send or receive the information via a network, or send or receive the information via intermediate elements, unless the first element is indicated to send or receive information "directly" to or from the second element.

Throughout the disclosure, one or more of the elements disclosed may be combined into a single device or into one or more devices. In addition, individual elements may be provided on separate devices.

As a vehicle is driven, the alignment of wheels on a vehicle may began to shift from the calibrated or proper position to an improper position. The improper position may be a position where wheel camber or is outside of a predetermined range corresponding to a properly calibrated camber. For example, negative camber is a condition where an angle between a plane corresponding to a face of the wheel and a plane perpendicular to the flat ground beneath the vehicle is such that the bottom of the wheel is further out from the center of the vehicle than the top of the wheel when viewed from the front of the vehicle. Positive camber is a condition where an angle between a plane corresponding to a face of the wheel and a plane perpendicular to the flat ground beneath the vehicle is such that the top of the wheel is further out from the center of the vehicle than the bottom of the wheel when viewed from the front of the vehicle.

In another example, a toe-in condition is a condition where an angle between a plane corresponding to a face of the wheel and a line parallel to the ground beneath the vehicle is such that the back part of the wheel is further out from the center of the vehicle than the front of the wheel when viewed from the top of the vehicle. A toe-out condition is a condition where an angle between a plane corresponding to a face of the wheel and a line parallel to the ground beneath the vehicle is such that the back part of the wheel is closer to the center of the vehicle than the front of the wheel when viewed from the top of the vehicle. According to yet another an example, a cross-toe condition is determined when a left wheel toe angle minus the right wheel toe angle differs from a calibrated value by a predetermined value and a total toe condition occurs when a left wheel toe angle plus the right wheel toe angle differs from a calibrated value by a predetermined value. Toe may be a distance measurement from a predetermined point at the front of the tire or as an angular deflection.

Usually, the aforementioned wheel alignment conditions may be diagnosed by measuring the distances between points of references and the wheels of the vehicles. Moreover, wheel alignment conditions may affect vehicle parameters such as a steering wheel angle parameter, a speed parameter, a lateral acceleration parameter, a self-aligning torque parameter and a power steering torque parameter.

Thus, a model to diagnose or detect a wheel alignment condition from the aforementioned vehicle parameters or other vehicle parameters may be created.

Figure 1:
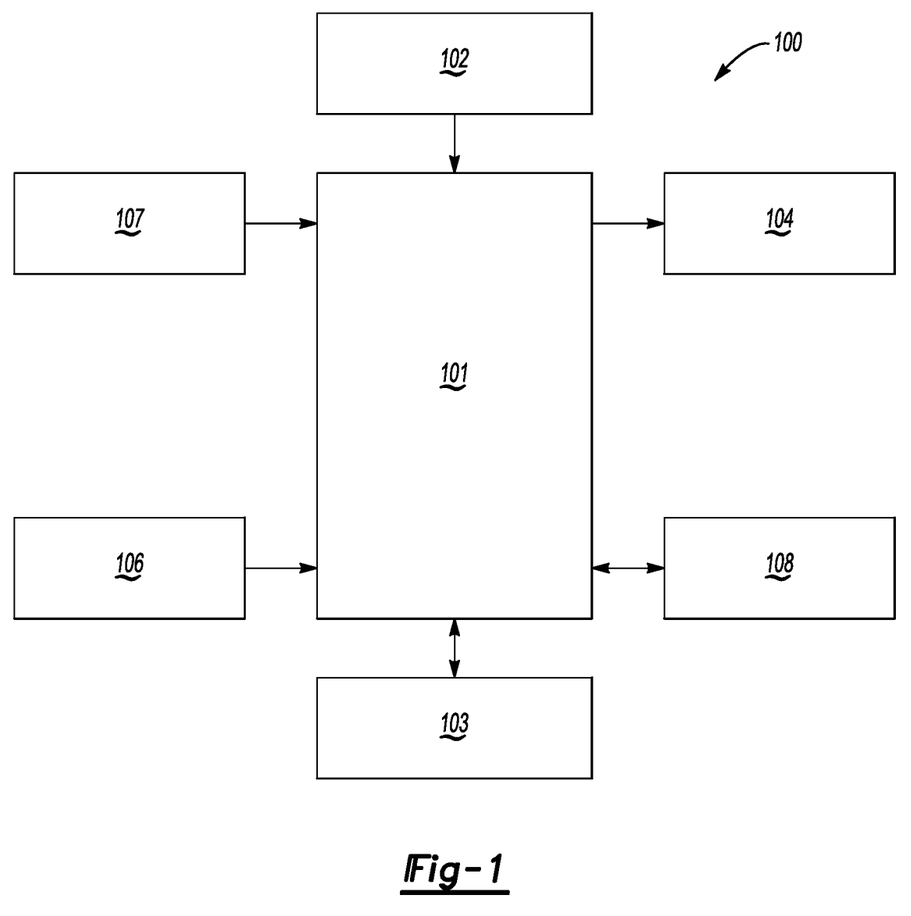
FIG. 1 shows a block diagram of an apparatus that detects a wheel alignment condition according to an exemplary embodiment.

FIG. 1 shows a block diagram of an apparatus that detects a wheel alignment condition 100 according to an exemplary embodiment. As shown in FIG. 1, the apparatus that detects a wheel alignment condition 100, according to an exemplary embodiment, includes a controller 101, a power supply 102, a storage 103, an output 104, a user input 106, a vehicle parameter sensor 107, and a communication device 108. However, the apparatus that detects a wheel alignment condition 100 is not limited to the aforementioned configuration and may be configured to include additional elements and/or omit one or more of the aforementioned elements. The apparatus that detects a wheel alignment condition 100 may be implemented as part of a vehicle, as a standalone component, as a hybrid between an on vehicle and off vehicle device, or in another computing device.

The controller 101 controls the overall operation and function of the apparatus that detects a wheel alignment condition 100. The controller 101 may control one or more of a storage 103, an output 104, a user input 106, a vehicle parameter sensor 107, and a communication device 108 of the apparatus that detects a wheel alignment condition 100. The controller 101 may include one or more from among a processor, a microprocessor, a central processing unit (CPU), a graphics processor, Application Specific Integrated Circuits (ASICs), Field-Programmable Gate Arrays (FPGAs), state machines, circuitry, and a combination of hardware, software and firmware components.

The controller 101 is configured to send and/or receive information from one or more of the storage 103, the output 104, the user input 106, the vehicle parameter sensor 107, and the communication device 108 of the apparatus that detects a wheel alignment condition 100. The information may be sent and received via a bus or network, or may be directly read or written to/from one or more of the storage 103, the output 104, the user input 106, the vehicle parameter sensor 107, and the communication device 108 of the apparatus that detects a wheel alignment condition 100. Examples of suitable network connections include a controller area network (CAN), a media oriented system transfer (MOST), a local interconnection network (LIN), a local area network (LAN), wireless networks such as Bluetooth and 802.11, and other appropriate connections such as Ethernet.

The power supply 102 provides power to one or more of the controller 101, the storage 103, the output 104, the user input 106, the vehicle parameter sensor 107, and the communication device 108, of the apparatus that detects a wheel alignment condition 100. The power supply 102 may include one or more from among a battery, an outlet, a capacitor, a solar energy cell, a generator, a wind energy device, an alternator, etc.

The storage 103 is configured for storing information and retrieving information used by the apparatus that detects a wheel alignment condition 100. The storage 103 may be controlled by the controller 101 to store and retrieve information received from the vehicle parameter sensor 107 and the communication device 108. The information may include one or more from among vehicle parameter information, wheel alignment condition, and/or values indication whether the wheel alignment is within a predetermined value based on the model. Wheel alignment condition information may include one or more from among a negative camber condition of wheels, a positive camber condition of wheels, a cross-camber condition of wheels, a toe-in condition of wheels, a toe-out condition of wheels, a cross-toe condition, a total-toe condition and a cross-caster condition of wheels. Vehicle parameter information may include one or more from among a steering wheel angle parameter, a speed parameter, a lateral acceleration parameter, a torsion bar torque parameter, a self-aligning torque parameter and a power steering torque parameter. The storage 103 may also include the computer instructions configured to be executed by a processor to perform the functions of the apparatus that detects a wheel alignment condition 100.

The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The output 104 outputs information in one or more forms including: visual, audible and/or haptic form. The output 104 may be controlled by the controller 101 to provide outputs to the user of the apparatus that detects a wheel alignment condition 100. The output 104 may include one or more from among a speaker, audio, a display, a centrally-located display, a head up display, a windshield display, a haptic feedback device, a vibration device, a tactile feedback device, a tap-feedback device, a holographic display, an instrument light, an indicator light, etc.

The output 104 may output notification including one or more from among an audible notification, a light notification, and a display notification. The notification may include information on a value indicating whether the wheel alignment condition is within a predetermined value based on the model, a negative camber condition of wheels, a positive camber condition of wheels, a cross-camber-condition of wheels, a toe-in condition of wheels, a toe-out condition of wheels, a cross-toe condition of wheels, a total-toe-condition of wheels and/or a cross-caster condition of wheels. The notification may also include information on a steering wheel angle parameter, a speed parameter, a lateral acceleration parameter, a self-aligning torque parameter and/or a power steering torque parameter.

The user input 106 is configured to provide information and commands to the apparatus that detects a wheel alignment condition 100. The user input 106 may be used to provide user inputs, etc., to the controller 101. The user input 106 may include one or more from among a touchscreen, a keyboard, a soft keypad, a button, a motion detector, a voice input detector, a microphone, a camera, a trackpad, a mouse, a touchpad, etc. The user input 106 may be configured to receive a user input to acknowledge or dismiss the notification output by the output 104. The user input 106 may also be configured to receive a user input to activate or deactivate the apparatus that detects a wheel alignment condition 100. For example, the setting to turn the system on or off may be selected by an operator via user input 106.

The vehicle parameter sensor 107 may include one or more from among a plurality of sensors configured to measure or detect vehicle parameters including one or more form among a steering wheel angle parameter, a speed parameter, a lateral acceleration parameter, a self-aligning torque parameter and a power steering torque parameter. For example, the steering wheel angle parameter may be measured by a transducer, a speed parameter may be measured by a wheel speed tachometer, a lateral acceleration parameter may be measured by an inertial measurement unit (IMU) such as an accelerometer, a gyroscope, a magnetometer, etc., a self-aligning torque parameter may be calculated from a torsion bar torque parameter and a power steering torque parameter, and a power steering torque parameter may be calculated from electronic power steering (EPS) motor current measurements.

The communication device 108 may be used by apparatus that detects a wheel alignment condition 100 to communicate with several types of external apparatuses according to various communication methods. The communication device 108 may be used to send/receive vehicle parameter information, wheel alignment condition, and/or values indication whether the wheel alignment is within a predetermined value based on the model.

The communication device 108 may include various communication modules such as one or more from among a telematics unit, a broadcast receiving module, a near field communication (NFC) module, a GPS receiver, a wired communication module, or a wireless communication module. The broadcast receiving module may include a terrestrial broadcast receiving module including an antenna to receive a terrestrial broadcast signal, a demodulator, and an equalizer, etc. The NFC module is a module that communicates with an external apparatus located at a nearby distance according to an NFC method. The GPS receiver is a module that receives a GPS signal from a GPS satellite and detects a current location. The wired communication module may be a module that receives information over a wired network such as a local area network, a controller area network (CAN), or an external network. The wireless communication module is a module that is connected to an external network by using a wireless communication protocol such as IEEE 802.11 protocols, WiMAX, Wi-Fi or IEEE communication protocol and communicates with the external network. The wireless communication module may further include a mobile communication module that accesses a mobile communication network and performs communication according to various mobile communication standards such as 3rd generation (3G), $3^{rd}$ generation partnership project (3GPP), long-term evolution (LTE), Bluetooth, EVDO, CDMA, GPRS, EDGE or ZigBee.

According to an exemplary embodiment, the controller 101 of the apparatus that that detects a wheel alignment condition 100 may be configured to receive a dataset comprising one or more from among a steering wheel angle parameter, a torsion bar torque parameter, a speed parameter, a lateral acceleration parameter, a self-aligning torque parameter and a power steering torque parameter, normalize the received dataset, analyze the normalized dataset according to a model for determining a wheel alignment condition; and output a value indicating whether the wheel alignment condition is within a predetermined value based on the model.

The controller 101 of the apparatus that that detects a wheel alignment condition 100 may be configured to analyze the normalized data according to the model by inputting the normalized dataset into a classification model generated based on a set of normalized training data including a steering wheel angle parameter, a speed parameter, a torsion bar torque parameter, a lateral acceleration parameter, a self-aligning torque parameter and power steering torque parameter, and receiving an output from the classification model indicating whether the wheel alignment is within a predetermined range. The predetermined value corresponds to a correctly calibrated wheel alignment. The controller 101 may control to output the value indicating whether the wheel alignment is within the predetermined value based on the model by displaying the value on vehicle display, a mobile device, or on a backend computer.

The controller 101 of the apparatus that that detects a wheel alignment condition 100 may be configured to generate the classification model by generating a training dataset including a first normalized dataset corresponding to proper wheel alignment and a second normalized dataset corresponding to improper wheel alignment, the first and second normalized data sets including parameters corresponding to a steering wheel angle parameter, a torsion bar torque parameter, a speed parameter, a lateral acceleration parameter, a self-aligning torque parameter and a power steering torque parameter, shuffling the training dataset, dividing the shuffled dataset into a classification training set and a classification validation set, training a classification model based on the classification training set, validating the trained classification model based on the classification validation set, and outputting the validated and trained classification model as the classification model.

The controller 101 of the apparatus that that detects a wheel alignment condition 100 may be configured to control to output the value indicating whether the wheel alignment is within the predetermined value based on the model by displaying the value on vehicle display, a mobile device, or on a backend computer. Moreover, the controller 101 of the apparatus that that detects a wheel alignment condition 100 may be configured to analyze the normalized dataset according to a model for determining wheel alignment condition by transmitting the normalized dataset to a server configured to analyze the normalized dataset and receiving the value indicating whether the wheel alignment condition is within the predetermined value from the server.

Figure 2:
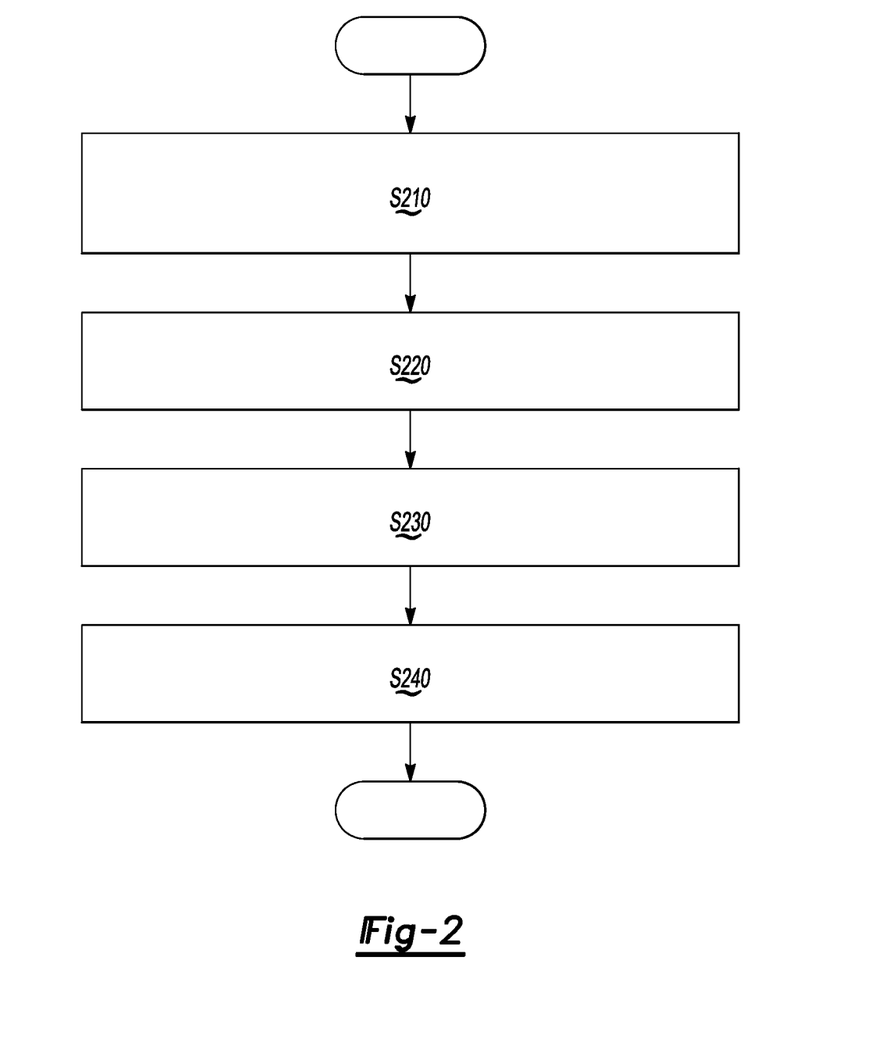
FIG. 2 shows a flowchart for a method of detecting a wheel alignment condition according to an exemplary embodiment.

FIG. 2 shows a flowchart for a method for detecting a wheel alignment condition according to an exemplary embodiment. The method of FIG. 2 may be performed by the apparatus detects a wheel alignment condition 100 or may be encoded into a computer readable medium as instructions that are executable by a computer to perform the method.

Referring to FIG. 2, a dataset including one or more from among a steering wheel angle parameter, a speed parameter, a lateral acceleration parameter, a self-aligning torque parameter and a power steering torque parameter is received in operation S210. The data is normalized in operation S220. Then, in operation 230, the normalized dataset is analyzed according to the model for determining a wheel alignment condition. Based on the analysis of operation S230, a value indicating whether the wheel alignment is within a predetermined value based on the model is output in operation S240. The predetermined value may correspond to a correctly calibrated wheel alignment. The value that is output may be correspond to one or more from among a proper alignment condition, an improper alignment condition, a negative camber condition or a condition where the top of one or more wheels point toward the vehicle when viewed from the front of a vehicle, a positive camber condition or a condition where the top of one or more wheels point away from the vehicle when viewed from the front of a vehicle, a toe in condition or a condition where one or more wheels point inward when viewed from the top of the vehicle, or a toe out condition or a condition where one or more wheels point outward when viewed from the top of the vehicle. The outputting the value indicating whether the wheel alignment is within the predetermined value based on the model may include displaying the value on vehicle display, a mobile device, or on a backend computer.

The analyzing the normalized data according to the model may be performed by using a classification model for determining a wheel alignment condition. In one example, the normalized dataset may be input into a classification model generated based on a set of normalized training data including a steering wheel angle parameter, a speed parameter, a lateral acceleration parameter, a torsion bar torque parameter, a self-aligning torque parameter and power steering torque parameter, and an output indicating whether the wheel alignment is within a predetermined range may be received from the classification model. The analyzing the normalized dataset according to a model for determining wheel alignment condition may include transmitting the normalized dataset to a server configured to analyze the normalized dataset and receiving the value indicating whether the wheel alignment condition is within the predetermined value from the server.

The received dataset may be normalized according to one from among scaling, standardization, and unit length normalization. Scaling a parameter may be performed according to the following equation:

$$x' = \frac{x - \min(x)}{\max(x) - \min(x)},$$

where x is the parameter and x' is the normalized parameter.

Standardization may be performed according the following equation:

$$x' = \frac{x - \bar{x}}{\sigma},$$

where x is the parameter, $\bar{x}$ is the mean value of x, $\sigma$ is the standard deviation of x, and x' is the normalized parameter.

Unit length normalization may be performed according to the following equation:

$$x' = \frac{x}{\|x\|},$$

where x is the parameter and x' is the normalized parameter.

Figure 3:
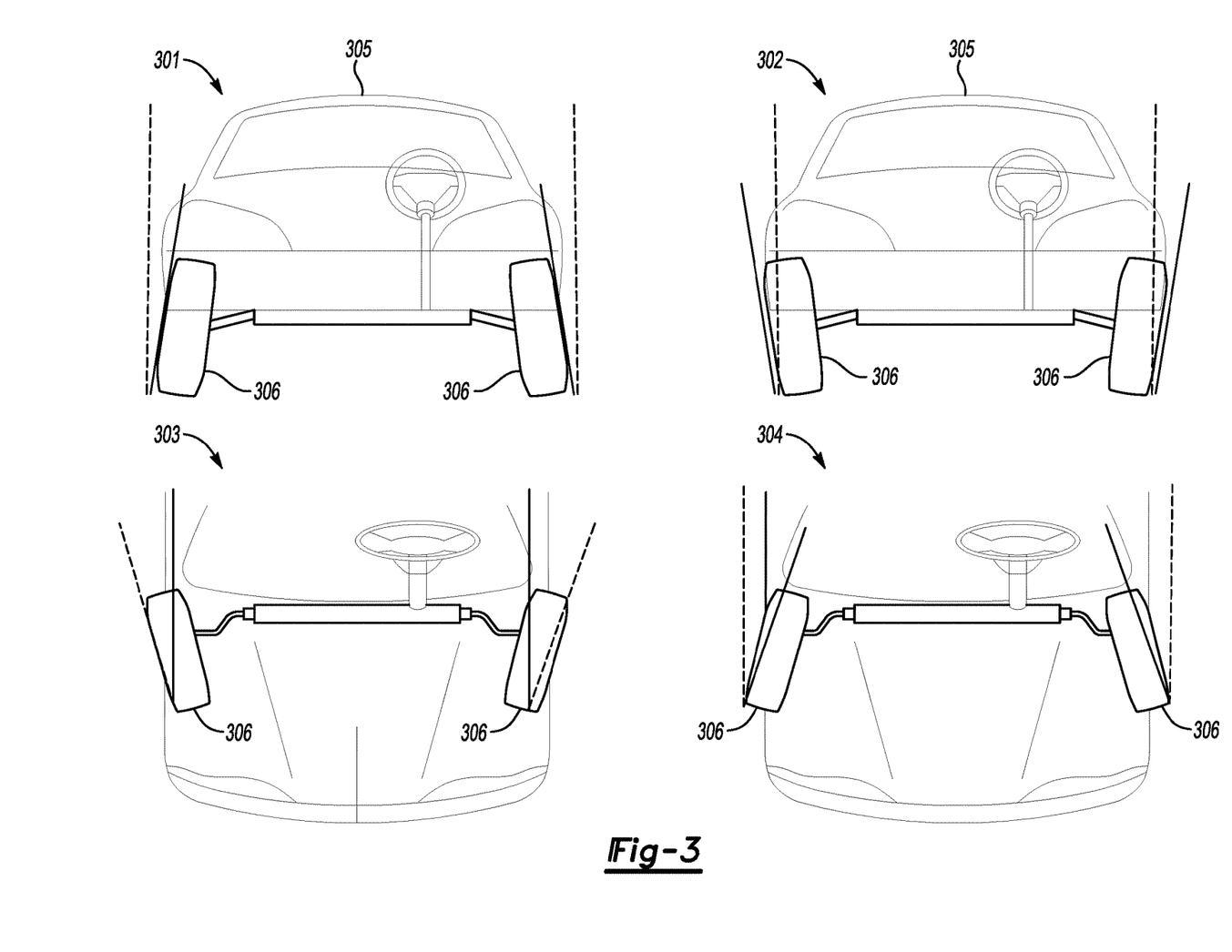
FIG. 3 shows illustrations of improper wheel alignment conditions according to an aspect of an exemplary embodiment.

FIG. 3 shows illustrations of improper wheel alignment conditions according to an aspect of an exemplary embodiment. Referring to FIG. 3, a negative camber condition or a condition where the top of one or more wheels point toward the vehicle when viewed from the front of a vehicle is shown in illustration 301. A positive camber condition or a condition where the top of one or more wheels point away from the vehicle when viewed from the front of a vehicle is shown in illustration 302. A toe-in condition or a condition where one or more wheels point inward when viewed from the top of the vehicle is shown in illustration 303. A toe-out condition or a condition where one or more wheels point outward when viewed from the top of the vehicle is shown in illustration 304.

Figure 4:
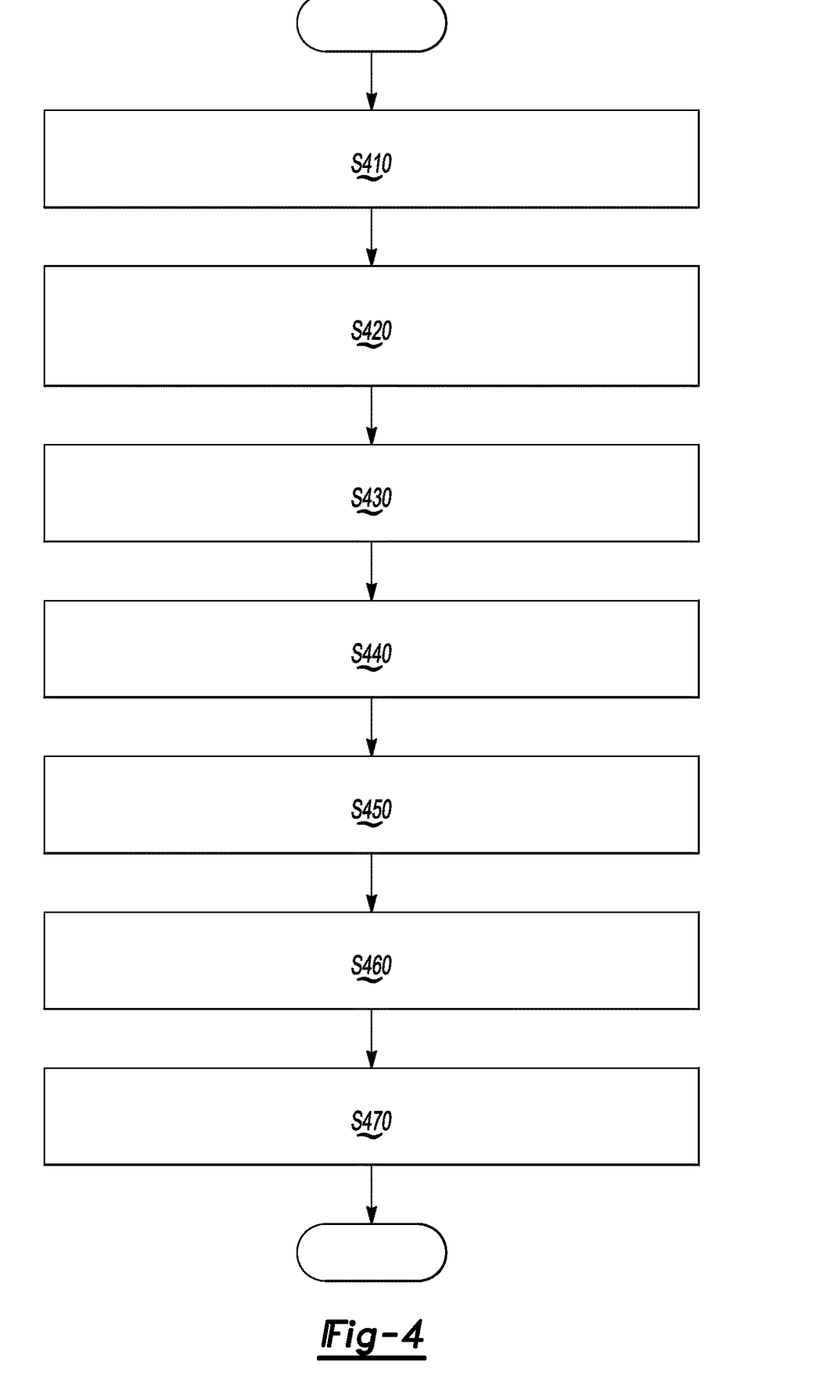
FIG. 4 shows a flow diagram for generating a classification model for determining a wheel alignment condition according to an aspect of an exemplary embodiment.

FIG. 4 shows a flowchart for generating a classification model for determining a wheel alignment condition according to an aspect of an exemplary embodiment. The method of FIG. 3 may be performed by the apparatus detects a wheel alignment condition 100 or may be encoded into a computer readable medium as instructions that are executable by a computer to perform the method.

Referring to FIG. 4, the classification model may be generated by sampling a first normalized dataset corresponding to proper wheel alignment and a second normalized dataset corresponding to improper wheel alignment in operation S410. The first and second normalized data sets may include parameters corresponding to one or more from among a steering wheel angle parameter, a speed parameter, a torsion bar torque parameter, a lateral acceleration parameter, a self-aligning torque parameter and a power steering torque parameter. In operation S420, a training dataset including a first normalized dataset corresponding to proper wheel alignment and a second normalized dataset corresponding to improper wheel alignment is generated based on the sampled first and second normalized dataset.

The training dataset is shuffled in operation S430 and the shuffled dataset is divided into a classification training set and a classification validation set in operation S440. The classification model is trained based on the classification training set in operation S450. The, in operation S460, the trained classification model is validated based on the classification validation set for tuning the parameters in the model. Once the optimal parameters have been obtained, the training and validation sets are combined to train and output the final classification model in operation S470.

Figure 5:
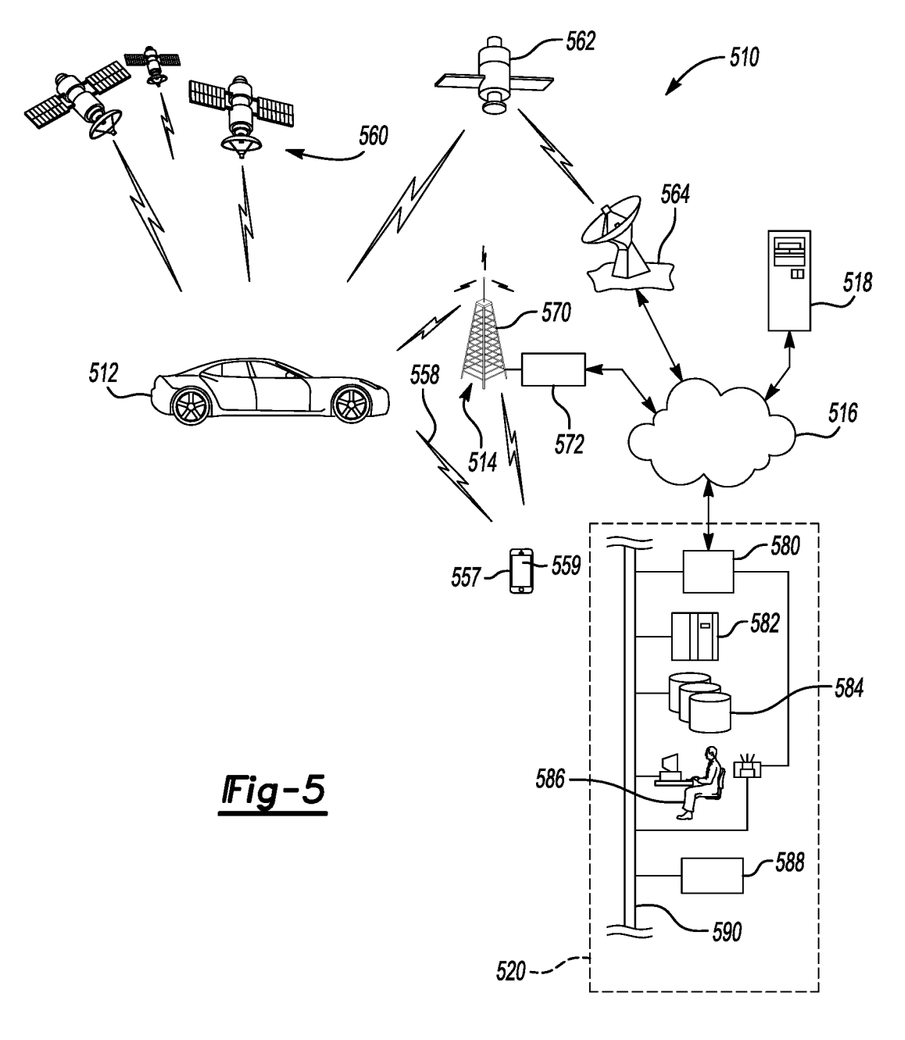
FIG. 5 shows a diagram of a system for reporting a wheel alignment condition according to an aspect of an exemplary embodiment.

FIG. 5 shows a diagram of a system for reporting a wheel alignment condition according to an aspect of an exemplary embodiment. In particular, FIG. 5 shows an illustration of an operating environment that comprises a mobile vehicle communications system 510 and that can be used to implement the apparatus and the method that detect a wheel alignment condition disclosed herein.

Referring to FIG. 5, an operating environment that comprises a mobile vehicle communications system 510 and that can be used to implement apparatus and the method for detecting the wheel alignment condition is shown. Communications system 510 may include one or more from among a vehicle 512, one or more wireless carrier systems 514, a land communications network 516, a computer 518, and a call center 520. It should be understood that the disclosed apparatus and the method for detecting wheel alignment condition can be used with any number of different systems and is not specifically limited to the operating environment shown here. The following paragraphs simply provide a brief overview of one such communications system 510; however, other systems not shown here could employ the disclosed apparatus and the method that detect a wheel alignment condition as well.

Vehicle 512 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. One or more elements of apparatus for detecting a hazardous vehicle 100 shown in FIG. 1 may be incorporated into vehicle 512.

One of the networked devices that can communicate with the communication device 108 is a wireless device, such as a smart phone 557. The smart phone 557 can include computer processing capability, a transceiver capable of communicating using a short-range wireless protocol 558, and a visual smart phone display 559. In some implementations, the smart phone display 559 also includes a touchscreen graphical user interface and/or a GPS module capable of receiving GPS satellite signals and generating GPS coordinates based on those signals. One or more elements of apparatus for detecting a hazardous vehicle 100 shown in FIG. 1 may be incorporated into smart phone 557.

The GPS module of the communication device 108 may receive radio signals from a constellation 560 of GPS satellites, recognize a location of a vehicle based on the on-board map details or by a point of interest or a landmark. From these signals the communication device 108 can determine vehicle position that is used for providing navigation and other position-related services to the vehicle driver. Navigation information can be presented by the output 104 (or other display within the vehicle) or can be presented verbally such as is done when supplying turn-by-turn navigation. The navigation services can be provided using a dedicated in-vehicle navigation module, or some or all navigation services can be done via the communication device 108. Position information may be sent to a remote location for purposes of providing the vehicle with navigation maps, map annotations (points of interest, restaurants, etc.), route calculations, and the like. The position information can be supplied to call center 520 or other remote computer system, such as computer 518, for other purposes, such as fleet management. Moreover, new or updated map data can be downloaded by the communication device from the call center 520.

The vehicle 512 may include vehicle system modules (VSMs) in the form of electronic hardware components that are located throughout the vehicle and typically receive input from one or more sensors and use the sensed input to perform diagnostic, monitoring, control, reporting and/or other functions. Each of the VSMs may be connected by a communications bus to the other VSMs, as well as to the controller 101, and can be programmed to run vehicle system and subsystem diagnostic tests. The controller 101 may be configured to send and receive information from the VSMs and to control VSMs to perform vehicle functions. As examples, one VSM can be an electronic controller unit, an engine control module (ECM) that controls various aspects of engine operation such as fuel ignition and ignition timing, another VSM can be an external sensor module configured to receive information from external sensors such as cameras, radars, LIDARs, and lasers, another VSM can be a powertrain control module that regulates operation of one or more components of the vehicle powertrain, another VSM can be the vehicle parameter sensor that detects a steering wheel angle parameter, a speed parameter, a lateral acceleration parameter, a self-aligning torque parameter and/or a power steering torque parameter, and another VSM can be a body control module that governs various electrical components located throughout the vehicle, like the vehicle's power door locks and headlights. According to an exemplary embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 512, as numerous others are also available.

Wireless carrier system 514 may be a cellular telephone system that includes a plurality of cell towers 570 (only one shown), one or more mobile switching centers (MSCs) 572, as well as any other networking components required to connect wireless carrier system 514 with land network 516. Each cell tower 570 includes sending and receiving antennas and a base station, with the base stations from different cell towers being connected to the MSC 572 either directly or via intermediary equipment such as a base station controller. Cellular system 514 can implement any suitable communications technology, including for example, analog technologies such as AMPS, or the newer digital technologies such as CDMA (e.g., CDMA2000 or 1×EV-DO) or GSM/GPRS (e.g., 4G LTE). As will be appreciated by those skilled in the art, various cell tower/base station/MSC arrangements are possible and could be used with wireless system 514. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 514, a different wireless carrier system in the form of satellite communication can be used to provide uni-directional or bi-directional communication with the vehicle. This can be done using one or more communication satellites 562 and an uplink transmitting station 564. Uni-directional communication can be, for example, satellite radio services, wherein programming content (news, music, etc.) is received by transmitting station 564, packaged for upload, and then sent to the satellite 562, which broadcasts the programming to subscribers. Bi-directional communication can be, for example, satellite telephony services using satellite 562 to relay telephone communications between the vehicle 512 and station 564. If used, this satellite telephony can be utilized either in addition to or in lieu of wireless carrier system 514.

Land network 516 may be a land-based telecommunications network that is connected to one or more landline telephones and connects wireless carrier system 514 to call center 520. For example, land network 516 may include a public switched telephone network (PSTN) such as that used to provide hardwired telephony, packet-switched data communications, and the Internet infrastructure. One or more segments of land network 516 could be implemented using a standard wired network, a fiber or other optical network, a cable network, power lines, other wireless networks such as wireless local area networks (WLANs), or networks providing broadband wireless access (BWA), or any combination thereof. Furthermore, call center 520 need not be connected via land network 516, but could include wireless telephony equipment so that it can communicate directly with a wireless network, such as wireless carrier system 514.

Computer 518 can be one of many computers accessible via a private or public network such as the Internet. Each such computer 518 can be used for one or more purposes, such as a web server accessible by the vehicle via the communication device 108 and wireless carrier 514. Other such accessible computers 518 can be, for example: a service center computer where diagnostic information, vehicle parameters and other vehicle data can be uploaded from the vehicle via the communication device 108; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 512 or call center 520, or both. A computer 518 can also be used for providing Internet connectivity such as DNS services or as a network address server that uses DHCP or other suitable protocol to assign an IP address to the vehicle 512.

Call center 520 is designed to provide the vehicle electronics with many different system back-end functions and, according to the exemplary embodiment shown here, generally includes one or more switches 580, servers 582, databases 584, live advisors 586, as well as an automated voice response system (VRS) 588. These various call center components may be coupled to one another via a wired or wireless local area network 590. Switch 580, which can be a private branch exchange (PBX) switch, routes incoming signals so that voice transmissions are usually sent to either the live adviser 586 by regular phone or to the automated voice response system 588 using VoIP. The live advisor phone can also use VoIP as indicated by the broken line in FIG. 5. VoIP and other data communication through the switch 580 is implemented via a modem (not shown) connected between the switch 580 and network 590. Data transmissions are passed via the modem to server 582 and/or database 584. Database 584 can store account information such as subscriber authentication information, vehicle identifiers, vehicle parameters, wheel alignment conditions, models for determining wheel alignment conditions, profile records, behavioral patterns, and other pertinent subscriber information. The server 582 may analyze the normalized dataset and control to transmit the value indicating whether the wheel alignment condition is within the predetermined value. Data transmissions may also be conducted by wireless systems, such as 802.11x, GPRS, and the like. Although the illustrated embodiment has been described as it would be used in conjunction with a manned call center 520 using live advisor 586, it will be appreciated that the call center can instead utilize VRS 588 to provide information on wheel alignment condition.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A method of detecting a wheel alignment condition, the method comprising:
receiving a dataset comprising one or more from among a steering wheel angle parameter, a speed parameter, a torsion bar torque parameter, a lateral acceleration parameter, a self-aligning torque parameter and a power steering torque parameter;
normalizing the received dataset;
analyzing the normalized dataset according to a model for determining a wheel alignment condition; and
outputting a value indicating whether the wheel alignment is within a predetermined value based on the model,
wherein the analyzing the normalized data according to the model comprises:
inputting the normalized dataset into a classification model generated based on a set of normalized training data including a torsion bar torque parameter, a steering wheel angle parameter, a speed parameter, a lateral acceleration parameter, a self-aligning torque parameter and a power steering torque parameter; and
receiving an output from the classification model indicating whether the wheel alignment is within a predetermined range, and
wherein the classification model is generated by:
generating a training dataset including a first normalized dataset corresponding to proper wheel alignment and a second normalized dataset corresponding to improper wheel alignment, the first and second normalized data sets including parameters corresponding to a steering wheel angle parameter, a speed parameter, a torsion bar torque parameter, a lateral acceleration parameter, a self-aligning torque parameter and a power steering torque parameter;
dividing the training dataset into a classification training set and a classification validation set;
training a classification model based on the classification training set;
validating the trained classification model based on the classification validation set for tuning the trained classification parameters; and
using the validated and trained classification model as the classification model.

2. The method of claim 1, wherein the classification model is further generated by
shuffling the training dataset.

3. The method of claim 1, wherein the normalizing the received dataset comprises normalizing the received dataset according to one from among scaling, standardization, and unit length normalization.

4. The method of claim 1, wherein the steering wheel angle parameter is measured by a transducer, the speed parameter is measured by a wheel speed tachometer, the lateral acceleration parameter is measured by an inertial measurement unit, the self-aligning torque parameter is calculated from a torsion bar torque parameter and the power steering torque parameter, and the power steering torque parameter is calculated from electronic power steering current measurements.

5. The method of claim 1, wherein the predetermined value corresponds to a correctly calibrated wheel alignment.

6. The method of claim 5, wherein the model for determining wheel alignment condition is capable of determining at least one from among a negative camber condition of wheels, a positive camber condition of wheels, a cross-camber condition of wheels, a toe-in condition of wheels, a toe-out condition of wheels, a cross-toe condition of wheels, a total-toe condition of wheels and a cross-caster condition of wheels.

7. The method of claim 1, wherein the outputting the value indicating whether the wheel alignment is within the predetermined value based on the model comprises displaying the value on vehicle display, a mobile device, or on a backend computer.

8. The method of claim 1, wherein the analyzing the normalized dataset according to a model for determining wheel alignment condition comprises transmitting the normalized dataset to a server configured to analyze the normalized dataset and receiving the value indicating whether the wheel alignment condition is within the predetermined value from the server.

9. A non-transitory computer readable medium comprising computer instructions executable by a computer to perform the method of claim 1.

10. An apparatus that detects a wheel alignment condition, the apparatus comprising:
   at least one memory comprising computer executable instructions; and
   at least one processor configured to read and execute the computer executable instructions, the computer executable instructions causing the at least one processor to:
   receive a dataset comprising one or more from among a steering wheel angle parameter, a speed parameter, a torsion bar torque parameter, a lateral acceleration parameter, a self-aligning torque parameter and a power steering torque parameter;
   normalize the received dataset;
   analyze the normalized dataset according to a model for determining a wheel alignment condition; and
   output a value indicating whether the wheel alignment condition is within a predetermined value based on the model,
   wherein the computer executable instructions cause the at least one processor to analyze the normalized data according to the model by:
      inputting the normalized dataset into a classification model generated based on a set of normalized training data including a torsion bar torque parameter, a steering wheel angle parameter, a speed parameter, a lateral acceleration parameter, a self-aligning torque parameter and a power steering torque parameter; and
      receiving an output from the classification model indicating whether the wheel alignment is within a predetermined range, and
   wherein the classification model is generated by:
      generating a training dataset including a first normalized dataset corresponding to proper wheel alignment and a second normalized dataset corresponding to improper wheel alignment, the first and second normalized data sets including parameters corresponding to a torsion bar torque parameter, a steering wheel angle parameter, a speed parameter, a lateral acceleration parameter, a self-aligning torque parameter and a power steering torque parameter;
      dividing the trained dataset into a classification training set and a classification validation set;
      training a classification model based on the classification training set;
      validating the trained classification model based on the classification validation set for tuning the trained classification; and
      outputting the validated and trained classification model as the classification model.

11. The apparatus of claim 10, wherein the classification model is further generated by
   shuffling the training dataset.

12. The apparatus of claim 10, wherein the computer executable instructions cause the at least one processor to normalize the received dataset according to one from among a scaling method, a standardization method, and a unit length normalization method.

13. The apparatus of claim 10, wherein the predetermined value corresponds to a correctly calibrated wheel alignment.

14. The apparatus of claim 10, wherein the model for determining the wheel alignment condition is configured to determine at least one from among a negative camber condition of wheels, a positive camber condition of wheels, a cross-camber condition of wheels, a toe-in condition of wheels, a toe-out condition of wheels, a cross-toe condition of wheels, a total toe condition of wheels and a cross-caster condition of wheels.

15. The apparatus of claim 10, wherein the computer executable instructions cause the at least one processor to determine the steering wheel angle parameter from a transducer, determine the speed parameter from a wheel speed tachometer, determine the lateral acceleration parameter from an inertial measurement unit, calculate the self-aligning torque parameter from a torsion bar torque parameter and the power steering torque parameter, and calculate the power steering torque parameter from electronic power steering current measurements.

16. The apparatus of claim 10, wherein the computer executable instructions cause the at least one processor to output the value indicating whether the wheel alignment is within the predetermined value based on the model by displaying the value on vehicle display, a mobile device, or on a backend computer.

17. The apparatus of claim 10, wherein the computer executable instructions cause the at least one processor to analyze the normalized dataset according to a model for determining wheel alignment condition by transmitting the normalized dataset to a server configured to analyze the normalized dataset and receiving the value indicating whether the wheel alignment condition is within the predetermined value from the server.

18. The apparatus of claim 10, where the at least one processor comprises a vehicle electronic controller unit configured to retrieve the one or more from among a torsion bar torque parameter, a steering wheel angle parameter, a speed parameter, a lateral acceleration parameter, a self-aligning torque parameter and a power steering torque parameter from a CAN bus.

* * * * *